United States Patent
Moe et al.

(10) Patent No.: US 8,192,039 B1
(45) Date of Patent: Jun. 5, 2012

(54) LIGHT EMITTING DIODE BACKUP SYSTEMS AND METHODS

(75) Inventors: Thomas Alan Moe, Lucas, TX (US); John Michael Killmeyer, Lucas, TX (US); Gene Wesley Rogers, Frisco, TX (US); Virgil Raymond Bodensteiner, Lowry Crossing, TX (US)

(73) Assignee: MOCO Enterprises LLC, Plano, TX (US)

( * ) Notice: Subject to any disclaimer, the term of this patent is extended or adjusted under 35 U.S.C. 154(b) by 0 days.

(21) Appl. No.: 12/970,715

(22) Filed: Dec. 16, 2010

(51) Int. Cl.
*F21V 19/04* (2006.01)

(52) U.S. Cl. .......................... 362/20; 362/800

(58) Field of Classification Search .................. 362/20, 362/800
See application file for complete search history.

(56) References Cited

U.S. PATENT DOCUMENTS

| | | | | |
|---|---|---|---|---|
| 4,144,462 A | * | 3/1979 | Sieron et al. | 307/66 |
| 4,150,302 A | * | 4/1979 | Roche | 307/66 |
| 5,148,158 A | * | 9/1992 | Shah | 340/3.7 |
| 5,471,129 A | * | 11/1995 | Mann | 340/636.1 |
| 5,661,645 A | * | 8/1997 | Hochstein | 363/89 |
| 7,360,910 B2 | * | 4/2008 | Korral et al. | 362/30 |
| 7,690,802 B2 | * | 4/2010 | Higley et al. | 362/20 |
| 2005/0157482 A1 | * | 7/2005 | Hsu | 362/20 |
| 2008/0080162 A1 | * | 4/2008 | Wilcox et al. | 362/20 |
| 2011/0211330 A1 | * | 9/2011 | Wang | 362/20 |

* cited by examiner

*Primary Examiner* — Diane Lee
*Assistant Examiner* — Sean Gramling
(74) *Attorney, Agent, or Firm* — Afghani Law Firm; Kevin Afghani

(57) ABSTRACT

Systems and methods for backing up LEDs are provided. In one embodiment, an LED backup system includes an LED backup controller operable to select from a plurality of power sources to supply electrical energy to a set of LEDs. The plurality of power sources includes a primary power source and a battery. The LED backup controller is adapted to be in selective electrical communication with the primary power source via a first electrical path. The LED backup controller is also adapted to be in electrical communication with the primary power source via a second electrical path. The LED backup controller is operable to select the battery to supply electrical energy to the set of LEDs in response to a failure of the LED backup controller to electrically communicate with the primary power source via the second electrical path.

16 Claims, 6 Drawing Sheets

LIGHT EMITTING DIODE BACKUP SYSTEMS AND METHODS

TECHNICAL FIELD

The illustrative embodiments relate generally to light emitting diodes, and more particularly, to backup systems and methods for light emitting diodes.

BACKGROUND

Light emitting diodes (LEDs) offer several advantages over previous lighting and signaling techniques that have led to their increased usage over time. Indeed, LEDs may now be found in a wide variety of applications and environments, both stationary and movable. Because LEDs depend upon a power source to emit light, LED systems may benefit from the inclusion of backup sources of power. Such backup systems may ensure, for example, that the LEDs continue to emit light even after the LEDs' primary source of power is no longer operational. However, some current LED backup systems may fail to provide customizable, efficient, compact, reliable, or flexible means of LED backup. By way of non-limiting example, current LED backup systems may fail to be integratable with currently-existing LED systems, and may even require the installation of additional LEDs as a source of backup lighting. Current LED backup systems may also suffer from other drawbacks that limit their usefulness or applicability.

SUMMARY

According to an illustrative embodiment, an LED backup system includes an LED backup controller operable to select from a plurality of power sources to supply electrical energy to a set of LEDs. The plurality of power sources includes a primary power source and a battery. The LED backup controller adapted to be in selective electrical communication with the primary power source via a first electrical path. The LED backup controller is adapted to be in electrical communication with the primary power source via a second electrical path. The LED backup controller is operable select the battery to supply electrical energy to the set of LEDs in response to a failure of the LED backup controller to electrically communicate with the primary power source via the second electrical path.

According to another illustrative embodiment, an LED backup system includes an LED backup controller operable to switch between a standard mode and a backup mode for supplying electrical energy to a set of LEDs. The LED backup controller is adapted to transmit electrical energy from a primary power source to the set of LEDs in the standard mode. The LED backup controller is adapted to be in selective electrical communication with the primary power supply via a first electrical path in the standard mode. The LED backup controller is adapted to transmit electrical energy from a battery to the set of LEDs in the backup mode. The LED backup controller is adapted to be in electrical communication with the primary power source via a second electrical path. The LED backup controller is operable to switch from the standard mode to the backup mode in response to a failure of the second electrical path to transmit electrical energy to the LED backup controller. The LED backup system also includes a status indicator in electrical communication with the LED backup controller. The status indicator signals a status of the battery.

According to another illustrative embodiment, a method for providing backup for a set of LEDs includes selectively receiving electrical energy from a primary power source via a first electrical path, and receiving electrical energy from the primary power source via a second electrical path. The method also includes detecting a failure of the second electrical path to transmit electrical energy, and switching from a standard mode to a backup mode for providing electrical energy to a set of LEDs in response to detecting the failure of the second electrical path to transmit electrical energy. In the standard mode, electrical energy supplied to the set of LEDs is receivable from the primary power source. In the backup mode, electrical energy is supplied to the set of LEDs is receivable from a battery.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
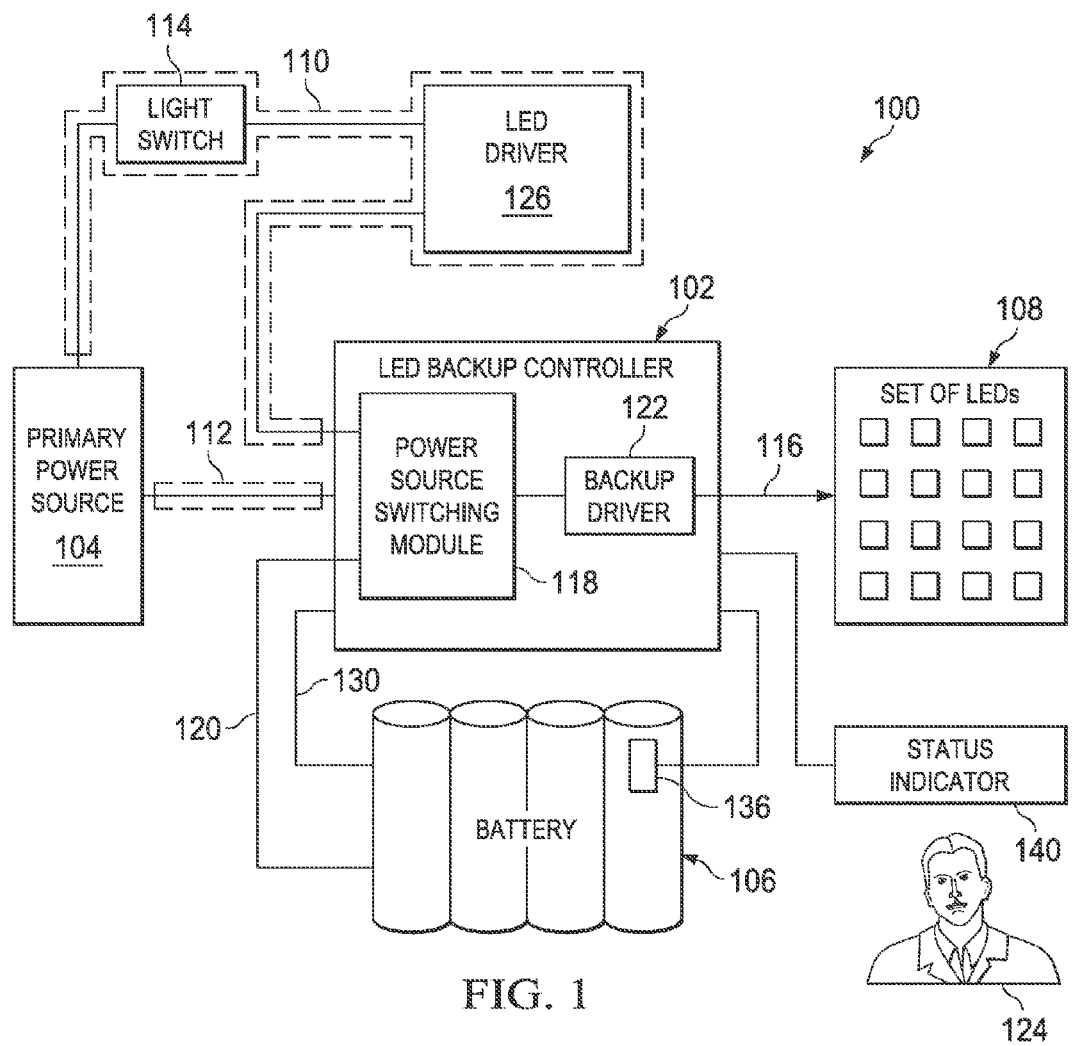
FIG. 1 is a schematic diagram of an LED backup system according to an illustrative embodiment.
Figure 2:
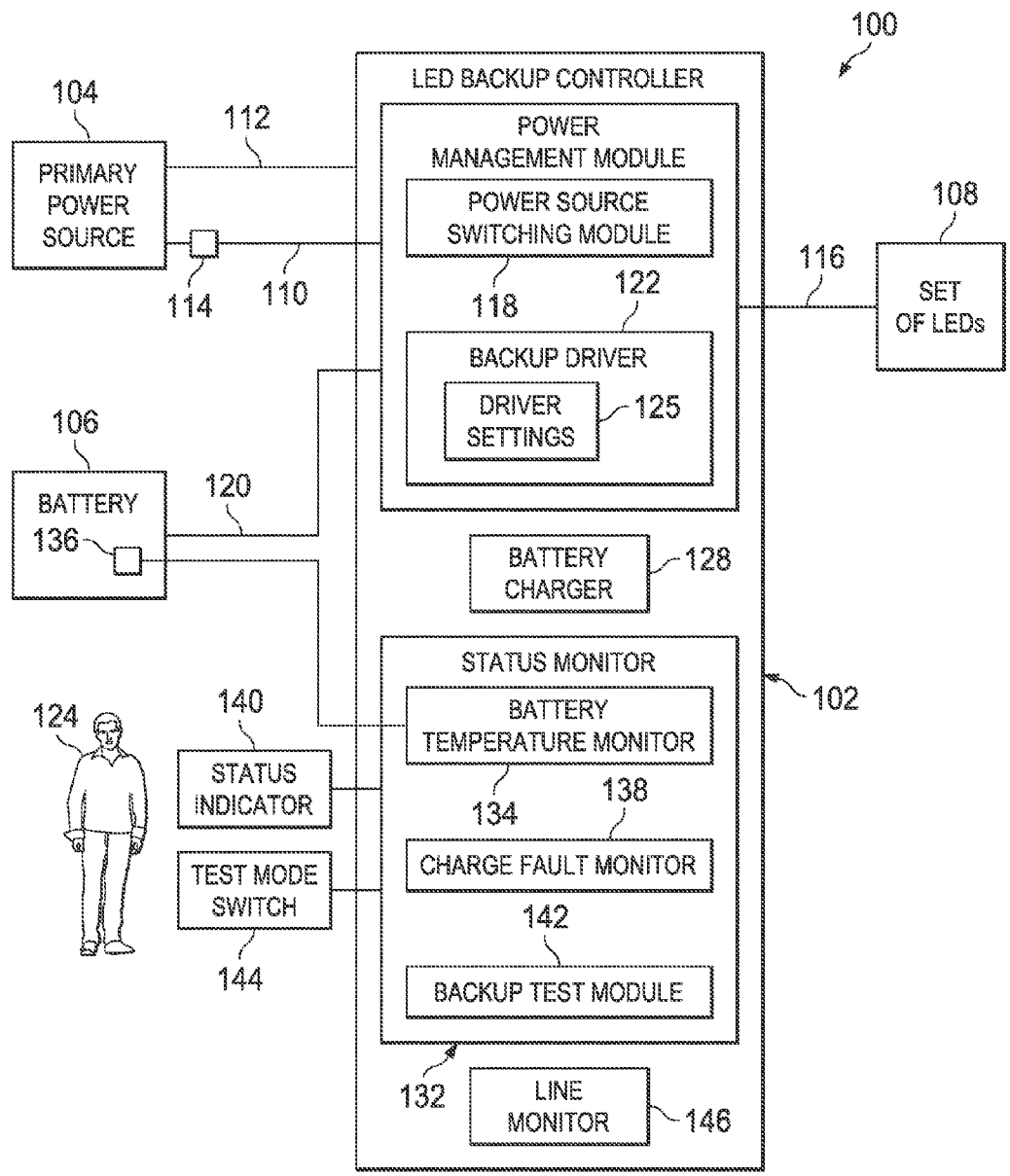
FIG. 2 is a schematic, block diagram of an LED backup system according to an illustrative embodiment.

Referring to FIGS. 1 and 2, an illustrative embodiment of an LED backup system 100 includes an LED backup controller 102 that selects from, or switches between, a primary power source 104 and one or more batteries 106 to provide electrical energy to a set of LEDs 108. As used herein, the term "set" encompasses a quantity of one or more. Unless otherwise indicated, as used herein, "or" does not require mutual exclusivity. The LED backup controller 102 is adapted to be in electrical communication, directly or indirectly, with the primary power source 104 via at least two electrical paths: a first electrical path 110 and a second electrical path 112. When the LED backup controller 102 is in standard mode, the LED backup controller 102 may receive, selectively based on a light switch 114, electrical energy from the primary power source 104 via the first electrical path 110 and transmit this electrical energy to the set of LEDs 108. The delivery of electrical energy from the LED backup controller 102 to the set of LEDs 108 may be via a delivery conduit 116. When in the standard mode, the light switch 114 may be turned on or off to control the flow of electrical energy from the primary power source 114 the LED backup controller 102 via the first electrical path 110, thus controlling whether the set of LEDs 108 are on or off.

The LED backup controller 102 may include a power source switching module 118 that selects from, or switches between, the primary power source 104 or the battery 106 to supply electrical energy to the set of LEDs 108. The power source switching module 118 may also provide electrical communication between the selected power source (e.g., the primary power source 104 or the battery 106) and the set of LEDs 108. In one embodiment, if the LED backup controller 102 detects a failure to electrically communicate with the primary power source 104 via the second electrical path 112, the power source switching module 118 may select the battery 106 to supply electrical energy to the set of LEDs 108, thus switching to backup mode. In backup mode, the LED backup controller 102 may receive electrical energy from the battery 106 via a battery conduit 120 and transmit this electrical energy to the set of LEDs 108 via the delivery conduit 116, thus causing the set of LEDs 108 to illuminate.

In one illustrative embodiment, the status of electrical communication via the second electrical path 112, as opposed to the first electrical path 110, provides a basis for switching from the standard mode to the backup mode. In this embodiment, the power source switching module 118 refrains from switching to backup mode when the LED backup controller 102 fails to receive electrical energy via the first electrical path 110; thus, the light switch 114 may be turned off while in standard mode without causing the power source switching module 118 to switch to the battery 106 as the supplier of electrical energy to the set of LEDs 108.

One possible cause for a failure to receive electrical energy via the second electrical path 112, resulting in a switch to backup mode, may be a failure of the primary power source 104. In one example, the second electrical path 112 may include a home run line that runs from an electrical service panel (not shown) to the LED backup controller 102. The home run line, in one non-limiting example, may be a direct or dedicated non-switched line that runs from the electrical service panel to the LED backup controller 102. Thus, if a power failure occurs to the building or other environment in which the LED backup system 100 resides, the second electrical path 112, or home run line, may fail to transmit electrical energy to the LED backup controller 102, thus causing the power source switching module 118 to switch to backup mode. Because the second electrical path 112, as opposed to the first electrical path 110, is monitored, the power source switching module 118 may be prevented from switching to backup mode when the light switch 114 is turned off.

The LED backup controller 102 may also include a backup driver 122. In one embodiment, the backup driver 122 may receive electrical energy from the battery 106 and provide an electric current to the set of LEDs 108 during backup mode. A set of driver settings 125 may be programmed, or otherwise stored, in the LED backup controller 102 and used by the backup driver 122 to determine certain LED illumination parameters during backup mode, including brightness and length of illumination time. The driver settings 125 may be defined prior to installation of the LED backup controller 102 with the set of LEDs 108, or may be dynamically determined by the user 124, or any other person, during operation of the LED backup system 100.

In one non-limiting example, the driver settings 125 that determine the brightness and period of time of illumination of the set of LEDs 108 during backup mode may be based on the power, or strength or output, of the battery 106 used in the LED backup system 100 (e.g., the milliampere-hours, the ampere-hours, the discharge curve, the voltage, etc. of the battery 106), or the load of the set of LEDs 108 at any particular brightness, or a combination of both. The driver settings 125 may also be based on a user-preferred LED brightness or length of illumination time during backup mode. For example, if a backup illumination time of 90 minutes is desired, the backup driver 122, as determined by the driver settings 125, may drive the brightness of the set of LEDs 108 (e.g., one-third brightness, half brightness, etc.) based on the power of the battery 106 and the required load of the set of LEDs 108 to allow for a 90 minutes backup time. Such flexibility in adapting to various powers and loads of batteries and LEDs, respectively, allow the LED backup system 100 to be used with a wide variety of different batteries and LEDs. The backup driver 122 also allows for a wide variety of LED brightnesses (e.g., one-third brightness, half brightness, etc.) and backup illumination times (e.g., 90 seconds, 90 minutes, 1 day, 1 week, etc.) during backup mode based on user preference or other factors.

The driver settings 125 may be determined or altered by a user, including via software prior to or after installation of the LED backup controller 102. In another embodiment, the LED backup controller 102 may determine the driver settings 125 based on known or detected specifications of system components (e.g., power of the battery 106, load of the set of LEDs 108, desired backup illumination time, etc.) The driver settings 125 may also be determined using any industry standard (e.g. Underwriters Laboratories (UL) standards, government standards, etc.) or any commercial standard.

The backup driver 122 may vary the brightness of the set of LEDs 108 during backup mode by varying the electric current, or current type, being delivered to the set of LEDs 108. In one non-limiting embodiment, the DC signals sent to the set of LEDs 108 by the backup driver 122 may be controlled by pulse width modulation, in square-wave form, constant, or any form of current capable of illuminating the set of LEDs 108. In another embodiment, the backup driver 122 may also be used to provide current to the set of LEDs 108 during standard mode.

The primary power source 104 may be any power source capable of supplying electrical energy. For example, the primary power source 104 may be a power source that provides electricity to a home, office, building, structure, or any other environment in which the set of LEDs 108 or the LED backup system 100 may be used. Other non-limiting examples of the primary power source 104 include a generator, an alternator, etc. The primary power source 104 may also be a wall outlet, or other type of electrical outlet.

The power source switching module 118 may include one or more devices that allow the LED backup controller 102 to switch between, or select from, two or more power sources (e.g., the primary power source 104 and the battery 106) as the supplier of electrical energy to the set of LEDs 108. In one non-limiting example, the power source switching module 118 may include a contactor, a contactor relay, a power relay, or other switching circuitry that is able to switch between receiving electrical energy from the primary power source 104 or the battery 106. In another embodiment, switching may also be performed using a semiconductor switching device. Additional details regarding an embodiment of a power source switching module 118 that utilizes a particular type of contactor is shown below in FIG. 3B. Indeed, the examples of electrical devices that may be used to switch between power sources are numerous.

In one embodiment, the first electrical path 110 may include a utility, or utility input, line. The first electrical path 110 may include any number of electrical conduits capable of transmitting electrical energy. Also, in one non-limiting embodiment, the first and second electrical paths 110 and 112 may run in parallel with one another. In another non-limiting embodiment, the LED backup system 100 may be implemented as open voltage or line voltage systems.

The first electrical path 110 may also include an LED driver 126. The LED driver 126 may provide an electrical current to the set of LEDs 108 via the LED backup controller 102 when the LED backup controller 102 selects the primary power source 104 to supply electrical energy to the set of LEDs 108 (standard mode). The LED driver 126 may include an AC/DC converter, and may, depending on the embodiment, be either integrated with or separate from the LED backup controller 102. In one example implementation of the illustrative embodiments, the LED backup controller 102, including the battery 106 as necessary, may be installed with an already-existing LED driver 126 and set of LEDs 108. Thus, the illustrative embodiments may be flexibly installed with existing LED lighting systems and provide customizable backup LED illumination based on a wide variety of factors, including those described above. Further, the illustrative embodiments may be installed in existing LED lighting systems without the need for additional illuminating LEDs, as some current systems require.

In one non-limiting embodiment, the LED backup system 100 may also include an LED driver monitor (not shown) that monitors whether the LED driver 126 is operational. In this embodiment, if the LED driver monitor determines that the LED driver 126 has ceased to be operational, the power source switching module 118 may switch to backup mode. By way of non-limiting example, the LED driver monitor may include a monitor point before and a monitor point after the LED driver 126 on the first electrical path 110; in this embodiment, if the monitor points show a voltage difference from a predetermined voltage, then the LED driver 126 may be determined to be non-operational and the power source switching module 118 may switch to backup mode.

The customizability of the LED backup controller 102 allows for its usage with a wide variety of battery and LED types. The set of LEDs 108 may include any number of LEDs capable of emitting light of any color. The set of LEDs 108 may also include an LED engine of any type. The LED backup system 100 is also compatible with a wide variety of battery types. Non-limiting examples of the battery 106 include, but are not limited to, nickel-metal hydride batteries, lithium ion batteries, nickel-cadmium batteries, etc. Also, the battery 106 may include multiple batteries.

In one embodiment of the operation of the LED backup system 100, the LED backup controller 102 may selectively receive electrical energy from the primary power source 104 via the first electrical path 110. This selective receiving of the electrical energy from the primary power source 104 via the first electrical path 110 may be due to the light switch 114, which may be switched on or off without causing the power source switching module 118 to switch to backup mode. The LED backup controller 102 may also receive electrical energy from the primary power source 104 via the second electrical path 112. The LED backup controller 102 may be able to detect whether the second electrical path 112 is transmitting electrical energy. If the LED backup controller 102 detects a failure of the second electrical path 112 to transmit electrical energy, which may, e.g., be caused by a power failure of the primary power source 104, the power source switching module 118 may switch from standard mode to backup mode so that the battery 106, instead of the primary power source 104, provides electrical energy to the set of LEDs 108 via the LED backup controller 102. Once the power source switching module 118 switches to the backup mode, the backup driver 122 may provide electrical energy to the set of LEDs 108 from the battery 106 to cause the set of LEDs 108 to have any brightness for any period of time, and the brightness and period of time may be in accordance with the driver settings 125.

As shown in FIG. 2, the LED backup controller 102 may also include a battery charger 128. If, at any time, the LED backup controller 102 determines that the battery 106 is not fully charged or charged to a predetermined, or preferred, level, the battery charger 128 may provide electrical energy to charge the battery 106 via a charging conduit 130. In one example, the battery charger 128 may charge the battery 106 when switching back to standard mode, regardless of whether the backup mode was in effect for the full predetermined period of backup time. Depending on the embodiment, the battery conduit 120 may be the same as or separate from the charging conduit 130. The battery charger 128 may charge the battery 106 at any rate, including a rate in conformity with any industry or commercial standard.

In one embodiment, the LED backup controller 102 may include a status monitor 132 that monitors the battery 106 or any other component of the LED backup system 100. For example, the status monitor 132 may determine whether the battery 106 is fully charged or at a predetermined charge level, in which case the battery 106 may be determined to have a fully charged status. In another example, the status monitor 132 may determine whether the battery 106 is currently being charged by the battery charger 128, in which case, the battery 106 may be determined to have a charging status.

In one embodiment, the status monitor 132 may determine whether a fault or battery failure has occurred within the battery 106. Such a battery failure may be determined in a variety of ways. In one embodiment, the status monitor 132 includes a battery temperature monitor 134 that is in electrical communication with a temperature sensor 136 adjacent or abutting the battery 106. The temperature sensor 136 may be any device capable of sensing or detecting a heat or temperature of one or more cells of the battery 106, including, but not limited to, a thermistor, a resistor, etc. In monitoring the temperature of the battery 106 using the temperature sensor 136, the battery temperature monitor 134 may determine that the battery 106 has a battery fault status if the temperature of the battery 106 exceeds a predetermined threshold. The predetermined threshold may be, for example, a temperature above which the battery 106 may be determined to be defective or dangerous. In another embodiment, the temperature sensor 136 may also be used to determine whether the battery 106 is fully charged by, for example, determining if the temperature of the battery 106 exceeds a predetermined temperature threshold after a predetermined or expected charge time of the battery 106.

In another embodiment, the status monitor 132 may include a charge fault monitor 138. The charge fault monitor 138 may determine whether the battery 106 has reached a predetermined charge level within a predetermined period of time. If the battery charger 128 is unable to charge the battery 106 to the predetermined charge level within the predetermined period of time, the status monitor 132 may determine that the battery 106 is faulty, and declare a battery fault status. The predetermined charge level used by the charge fault monitor 138 may be, for example, a full charge or a float voltage charge. The predetermined charge level, furthermore, may or may not be the charge capacity of the battery 106. The predetermined period of time used by the charge fault monitor 138 may be any period of time (e.g., 15 minutes, 45 minutes, 90 minutes, one day, etc.), and may, in one example, be in conformity with any industry or commercial standard(s).

Either or both of the battery temperature monitor 134 or the charge fault monitor 138 may be included in the status monitor 132 to determine whether the battery 106 is suffering from a fault. If the battery 106 is determined to have a battery fault status, the LED backup controller 102 may instruct the battery charger 128 to cease charging the battery 106. In one embodiment, the LED backup system 100 may also include a status indicator 140 that is in electrical communication with the status monitor 132 and signals the status of the battery 106 as determined by the status monitor 132. For example, the status indicator 140 may signal whether the battery 106 has a fully charged status, a charging status, a battery fault status, or any other status.

The status indicator 140 may be any type of indicator capable of signaling the battery status to the user 124. For example, the status indicator 140 may be an LED or other lighting source, a speaker or sound-emitting device, or a messaging system (e.g., e-mail, SMS, etc.) that alerts the user 124 of the battery status. By way of specific non-limiting example, in the embodiment in which the status indicator is an LED, the status indicator 140 may continuously emit light when the battery 106 is fully charged, slowly flash when the battery 106 is charging, and quickly flash when a battery fault status has been declared by the status monitor 132.

The status monitor 132 may also include a backup test module 142 that initiates, upon selection of a test mode switch 144 by the user 124, a test mode. In test mode, the power source switching module 118 may switch from standard mode to backup mode for a predetermined test period of time, thereby allowing the user 124 to test whether the LED backup system 100 is functioning properly in backup mode. The test period of time during which the test mode may be implemented may vary depending on the embodiment (e.g., 90 seconds, 90 minutes, one day, etc.).

In one embodiment, the LED backup controller 102 may include a line monitor 146 that monitors the second electrical path 112 at or during a predetermined elapsed time (e.g., 90 seconds, 5 minutes, 90 minutes, 1 day, etc.) after the LED backup controller 102 switches to the battery 106 to supply electrical energy to the set of LEDs 108. If, at the predetermined elapsed time after switching to backup mode, the line monitor 146 detects that the second electrical path 112 has resumed transmitting electrical energy from the primary power source 104, the power source switching module 118 may switch from backup mode back to standard mode to resume supplying the set of LEDs 108 with electrical energy from the primary power source 104. The line monitor 146, in another embodiment, may continuously monitor the second electrical path 112 during the predetermined elapsed time after switching to backup mode. If, upon switching back to standard mode, the status monitor 132 determines that the battery 106 is not fully charged or at a predetermined charge level, the battery charger 128 may charge the battery 106 and the status indicator 140 may signal a battery charging status.

Figure 3A:
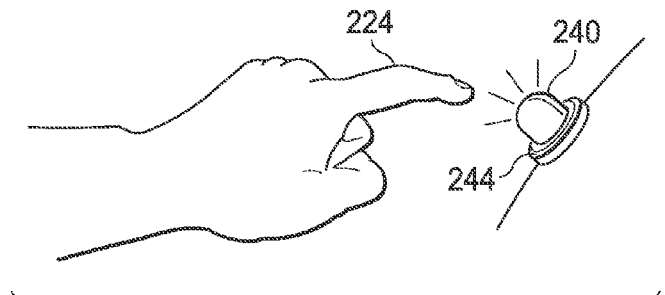
FIG. 3A is a schematic, pictorial representation of an integrated status indicator and test mode switch according to an illustrative embodiment.

Referring to FIG. 3A, an illustrative embodiment of the status indicator 240 integrated with the test mode switch 244 is shown. Elements of FIG. 3A that are analogous to elements in FIGS. 1 and 2 have been shown by indexing the reference numerals by 100. In the integrated device shown in FIG. 3A, which may be coupled, directly or indirectly, to any part of the LED backup system 100 described in FIGS. 1 and 2, a status of the battery may be signaled to the user 224 while providing the user 224 with the ability to press the test mode switch 244 to initiate test mode. Thus, the integrated device shown in FIG. 3A acts as both the status indicator 240 and the test mode switch 244. In other embodiments, however, the test mode switch 244 and the status indicator 240 may be separate devices.

Figure 3B:
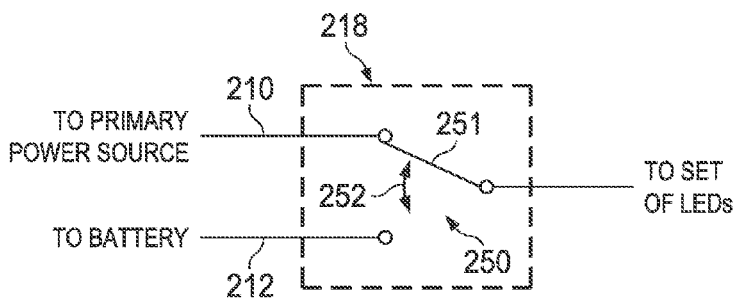
FIG. 3B is a schematic diagram of one illustrative, non-limiting embodiment of a power source switching module.

Referring to FIG. 3B, one illustrative embodiment of the power source switching module 218 may include a contactor 250 that switches between, or selects from, the primary power source and the battery as the supplier of electrical energy to the set of LEDs. The contactor 250 has an arm 251 that is movable (as shown by arrow 252) between two or more positions so that electrical or physical contact may be made with either the first electrical path 210 or the second electrical path 212. When in standard mode, the contactor 250 may electrically communicate with the first electrical path 210 to selectively transmit electrical energy from the primary power source to the set of LEDs. When in backup mode, the contactor 250 may electrically communicate with the second electrical path 212 to transmit electrical energy from the battery to the set of LEDs. It will be appreciated that numerous devices or techniques may be used in lieu of or in addition to the contactor 250 to switch between standard mode and backup mode.

Figure 4:
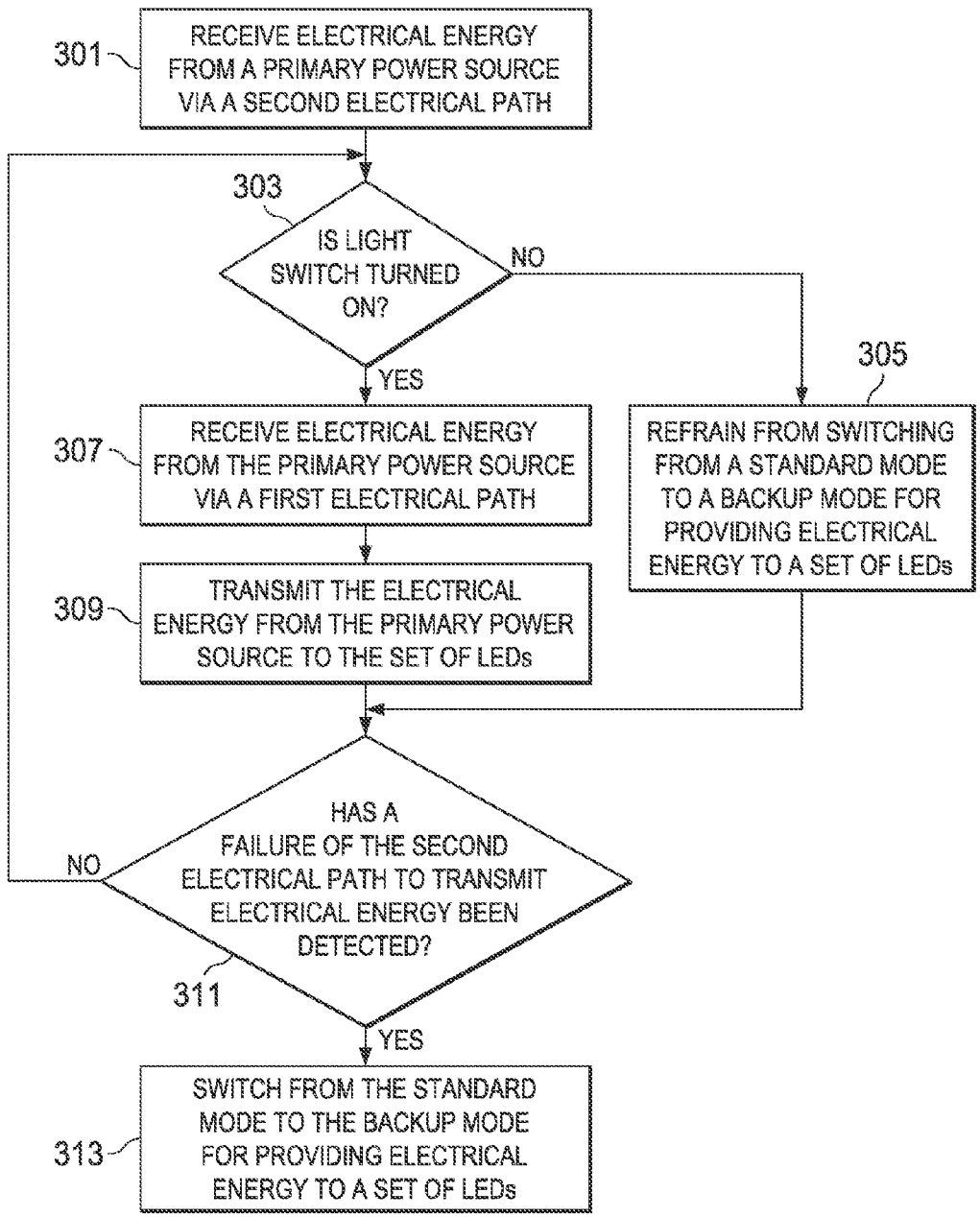
FIG. 4 is a flowchart of a process for providing backup for a set of LEDs according to an illustrative embodiment.

Referring to FIG. 4, an illustrative embodiment of a process for providing backup for a set of LEDs, which may be implemented by the LED backup controller 102 shown in FIGS. 1 and 2, includes receiving electrical energy from a primary power source via a second electrical path (step 301). If a light switch, located on a first electrical path, is turned off (step 303), the process refrains from switching from a standard mode to a backup mode for providing electrical energy to a set of LEDs (step 305). The process then proceeds to step 311.

Returning to step 303, if the light switch is turned on, the process receives electrical energy from the primary power source via a first electrical path (step 307). The process transmits electrical energy from the primary power source to the set of LEDs (step 309). The process determines whether a failure of the second electrical path to transmit electrical energy has been detected (step 311). If the process determines that a failure of the second electrical path to transmit electrical energy has not been detected, the process returns to step 303. If the process determines that a failure of the second electrical path to transmit electrical energy has been detected, the process switches from the standard mode to the backup mode for providing electrical energy to the set of LEDs (step 313).

Figure 5:
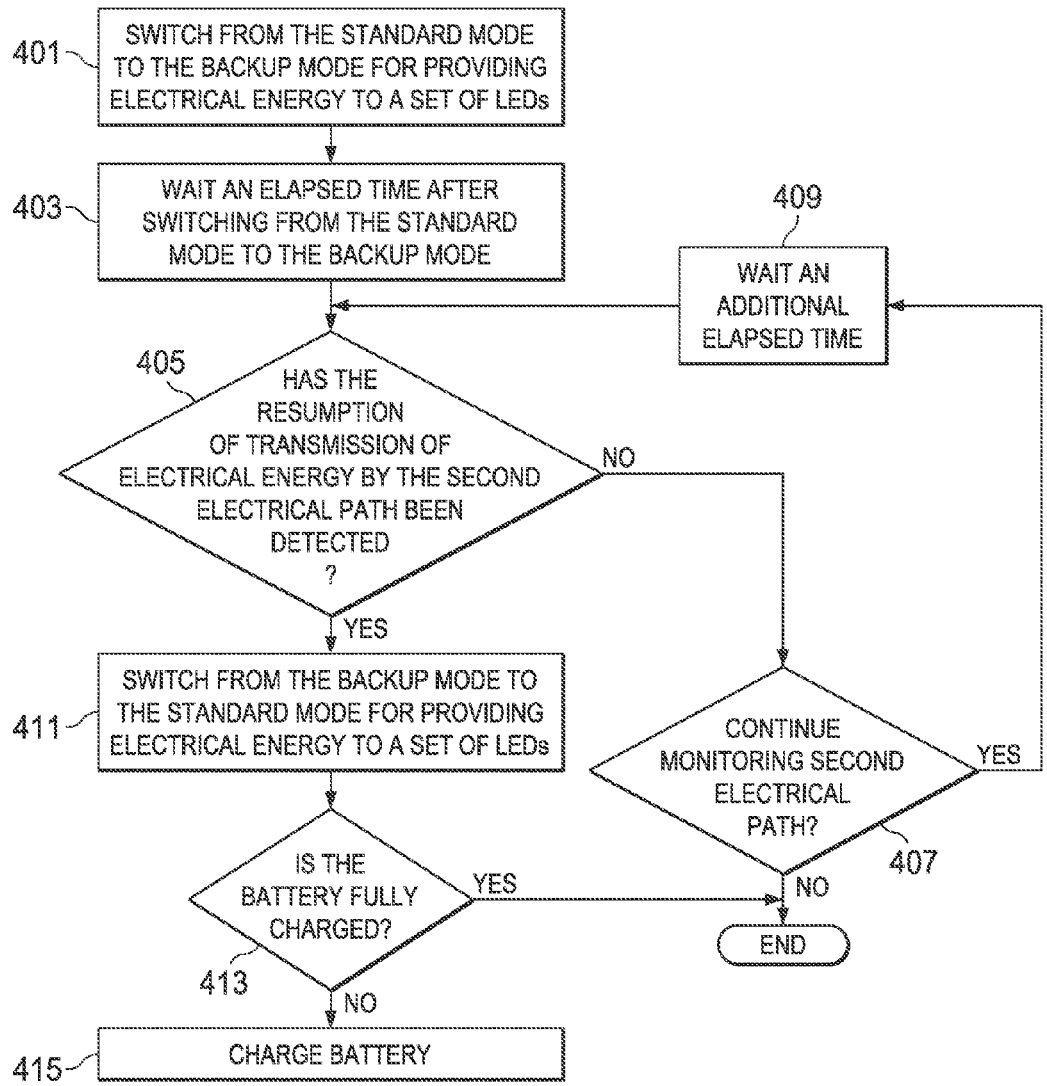
FIG. 5 is a flowchart of a process for monitoring a second electrical path upon switching to backup mode according to an illustrative embodiment.

Referring to FIG. 5, an illustrative embodiment of a process for monitoring a second electrical path upon switching to backup mode, which may be implemented by the LED backup controller 102 shown in FIGS. 1 and 2, includes switching from the standard mode to the backup mode for providing electrical energy to a set of LEDs (step 401). The process waits an elapsed time after switching from the standard mode to the backup mode (step 403). The process determines whether a resumption of transmission of electrical energy by the second electrical path has been detected (step 405). If the process determines that a resumption of transmission of electrical energy by the second electrical path has not been detected, the process determines whether to continue monitoring the second electrical path (step 407). If the process determines to continue monitoring the second electrical path, the process may wait an additional elapsed time (step 409). The process may then return to step 405. Returning to step 407, if the process determines not to continue monitoring the second electrical path, the process may then terminate.

Returning to step 405, if the process determines that the resumption of transmission of electrical energy by the second electrical path has been detected, the process switches from the backup mode to the standard mode for providing electrical energy to the set of LEDs (step 411). The process may then determine whether the battery is fully charged (step 413). If the process determines that the battery is not fully charged, the process may charge the battery (step 415). Returning to step 413, if the process determines that the battery is fully charged, the process may then terminate.

Figure 6:
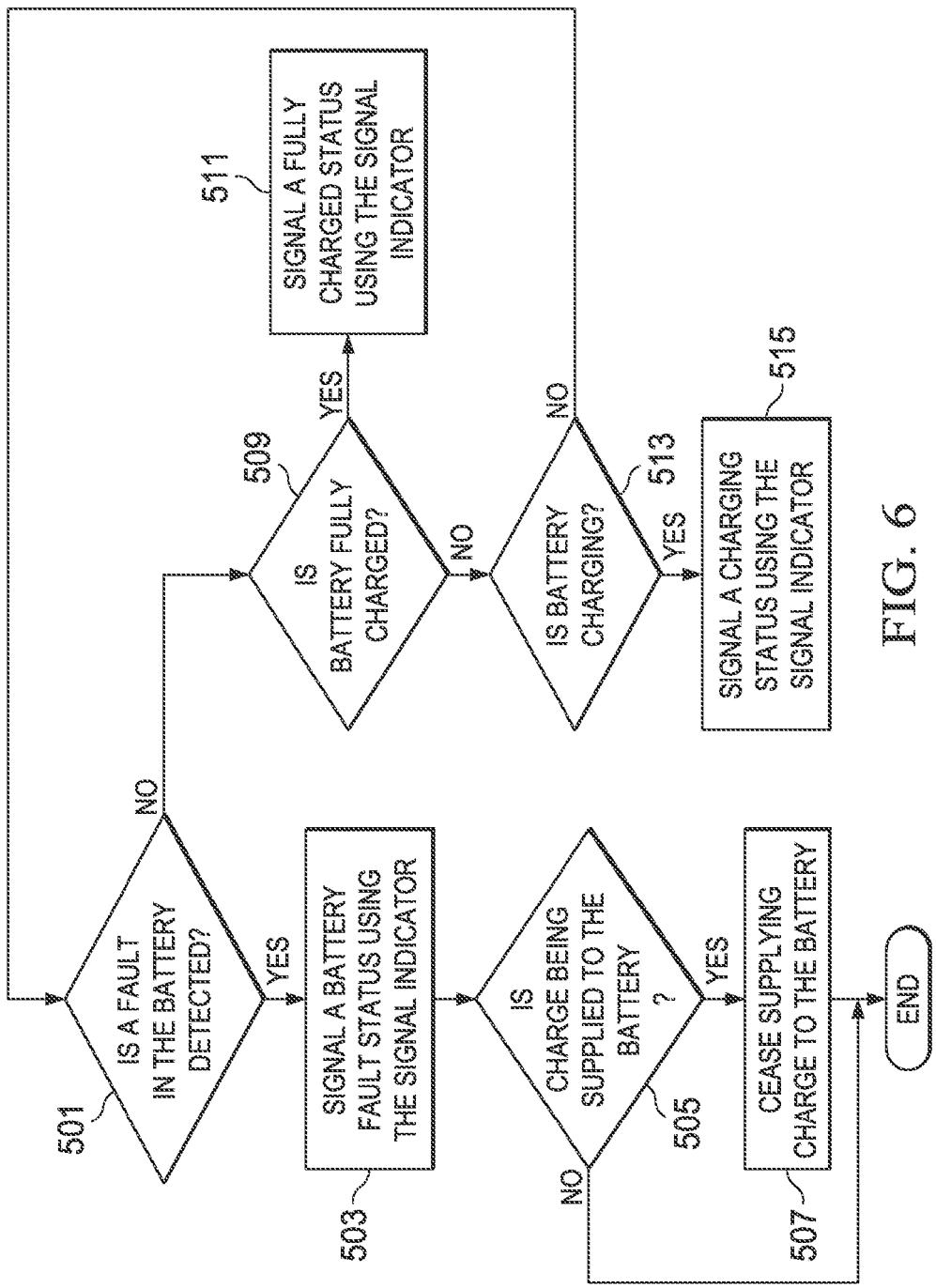
FIG. 6 is a flowchart of a process for determining, signaling, and/or managing the status of a battery according to an illustrative embodiment.

Referring to FIG. 6, an illustrative embodiment of a process for determining, signaling, and/or managing the status of the battery, which may be implemented by the LED backup controller 102 shown in FIGS. 1 and 2, includes determining whether a fault in the battery has been detected (step 501). If the process determines that a fault in the battery has been detected, the process signals a battery fault status using the signal indicator (step 503). The process may then determine whether charge is being supplied to the battery (step 505). If the process determines that charge is being supplied to the battery, the process ceases supplying charge the battery (step 507). The process may then terminate. Returning to step 505, if the process determines that charge is not being supplied to the battery, the process may then terminate.

Returning to step 501, if the process determines that a fault in the battery has not been detected, the process may determine whether the battery is fully charged (step 509). If the process determines that the battery is fully charged, the process signals a fully charged status using the signal indicator (step 511). Returning to step 509, if the process determines that the battery is not fully charged, the process may determine whether the battery is charging (step 513). If the process determines that the battery is charging, the process may signal a charging status using the signal indicator (step 515). Returning to step 513, if the process determines that the battery is not charging, the process may return to step 501 to continue monitoring the status of the battery.

Figure 7:
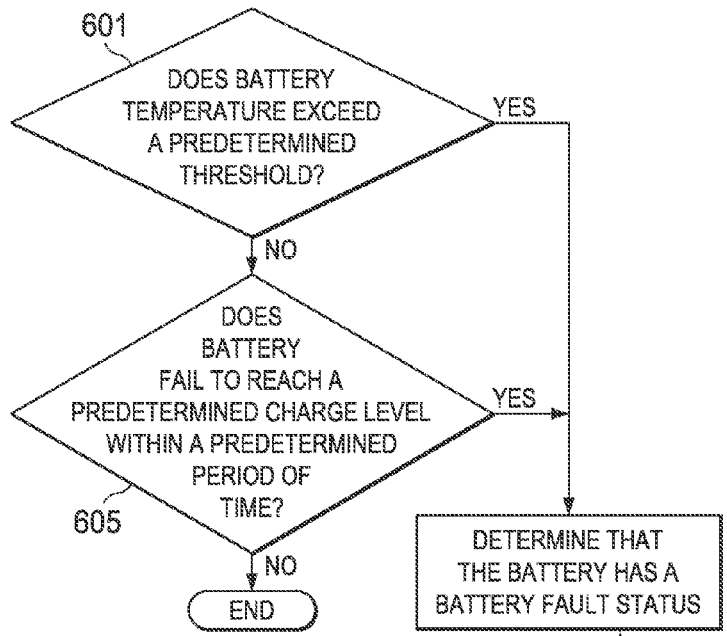
FIG. 7 is a flowchart of a process for determining a fault status of the battery according to an illustrative embodiment.

Referring to FIG. 7, an illustrative embodiment of a process for determining a fault status of the battery, which may be implemented in step 501 of FIG. 6, includes determining whether the battery temperature exceeds a predetermined threshold (step 601). If the process determines that the battery temperature exceeds a predetermined threshold, the process determines that the battery has a battery fault status (step 603). Returning to step 601, if the process determines that the battery temperature does not exceed a predetermined threshold, the process may determine whether the battery fails to reach a predetermined charge level within a predetermined period of time (step 605). If the process determines that the battery does fail to reach a predetermined charge level within the predetermined period of time, the process may determine that the battery has a battery fault status (step 603). Returning to step 605, if the process determines that the battery does not fail to reach a predetermined charge level within a predetermined period of time, the process may then terminate.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A light emitting diode (LED) backup system comprising:
  an LED backup controller operable to select from a plurality of power sources to supply electrical energy to a set of LEDs, the plurality of power sources comprising a primary power source and a battery, the LED backup controller adapted to be in selective electrical communication with the primary power source via a first electrical path, the LED backup controller adapted to be in electrical communication with the primary power source via a second electrical path, the second electrical path being a non-switchable electrical path, the LED backup controller operable to select the battery to supply electrical energy to the set of LEDs in response to a failure of the LED backup controller to electrically communicate with the primary power source via the second electrical path, the LED backup controller adapted to relay a first electric current, provided by an LED driver, to the set of LEDs when the primary power source is selected to supply electrical energy to the set of LEDs, the LED backup controller further comprising:
    an LED backup driver to provide a second electric current to the set of LEDs when the battery is selected to supply electrical energy to the set of LEDs;
  a battery charger to provide electrical energy to charge the battery; and a status monitor to determine a status of the battery, wherein the status monitor comprises: a charge fault monitor to determine whether the charger has charged the battery to a predetermined charge level within a predetermined period of time, wherein the status monitor determines that the battery has a battery fault status when the charge fault monitor determines that the battery is unable to reach the predetermined charge level within the predetermined period of time, the predetermined period of time being a period of time determined prior to the status monitor determining the status of the battery, the predetermined charge level being a charge level determined prior to the status monitor determining the status of the battery.

2. The LED backup system of claim 1, wherein a power source selected by the LED backup system is a selected power source, wherein the LED backup controller further comprises:
  a power source switching module to select from the plurality of power sources, the power source switching module providing electrical communication between the selected power source and the set of LEDs.

3. The LED backup system of claim 1, wherein the second electrical path comprises a home run line.

4. The LED backup system of claim 1, wherein the first electrical path comprises a light switch to control a supply of electrical energy to the LED backup controller, the LED backup controller refraining from selecting the battery to supply electrical energy to the set of LEDs when the light switch is turned to an off position.

5. The LED backup system of claim 1, wherein the LED backup controller further comprises:
   a status monitor to determine a status of the battery;
   wherein the LED backup system further comprises a temperature sensor adjacent the battery;
   wherein the status monitor further comprises a battery temperature monitor in electrical communication with the temperature sensor, the battery temperature monitor to monitor a temperature of the battery using the temperature sensor; and
   wherein the status monitor determines that the battery has a battery fault status when the temperature of the battery exceeds a predetermined threshold.

6. The LED backup system of claim 1, wherein the LED backup driver provides the second electric current to the set of LEDs to cause the set of LEDs to have a brightness for a period of time when the LED backup controller selects the battery to supply electrical energy to the set of LEDs, the brightness and the period of time determined by a set of pre-definable driver settings.

7. The LED backup system of claim 6, wherein the set of pre-definable driver settings are determined based on one or more of a plurality of factors, the plurality of factors comprising an output of the battery, a desired period of time to provide electric current to the set of LEDs when the LED backup controller selects the battery to supply electrical energy to the set of LEDs, and a desired brightness of the set of LEDs when the LED backup controller selects the battery to supply electrical energy to the set of LEDs.

8. The LED backup system of claim 6, wherein the set of pre-definable driver settings are adjustable to enable the LED backup controller to accommodate batteries of varying outputs and LEDs of varying loads.

9. The LED backup system of claim 1, wherein the LED backup controller further comprises:
   a line monitor to monitor the second electrical path during and after the predetermined elapsed time to determine whether electrical communication between the LED backup controller and the primary power source has resumed or been interrupted via the second electrical path;
   wherein, after the predetermined elapsed time, the LED backup controller switches from the battery to the primary power source to supply electrical energy to the set of LEDs in response to a resumption of the electrical communication between the LED backup controller and the primary power source via the second electrical path.

10. The LED backup system of claim 1, further comprising:
    the set of LEDs in electrical communication with the LED backup controller via a delivery conduit, the set of LEDs adapted to emit light; and
    the battery in electrical communication with the LED backup controller via a battery conduit, the battery to provide electrical energy to the set of LEDs via the battery conduit, the LED backup controller, and the delivery conduit when the LED backup controller selects the battery to supply electrical energy to the set of LEDs.

11. The LED backup system of claim 1, wherein the LED backup driver provides the second electric current to the set of LEDs according to a set of definable driver settings, the set of definable driver settings determining at least a period of time to provide the second electric current to the set of LEDs when the LED backup controller selects the battery to supply electrical energy to the set of LEDs, and a brightness of the set of LEDs when the LED backup controller selects the battery to supply electrical energy to the set of LEDs.

12. The LED backup system of claim 1, further comprising:
    the LED driver to provide the first electrical current to the set of LEDs via the LED backup controller when the LED backup controller selects the primary power source to supply electrical energy to the set of LEDs;
    wherein the LED driver is physically external to the LED backup controller;
    wherein the LED driver is included in the first electrical path; and
    wherein the LED driver is usable to provide the first electric current to the set of LEDs prior to the installation of the LED backup controller.

13. The LED backup system of claim 1, wherein the LED backup controller is installable into an existing LED lighting system having the LED driver and the set of LEDs, the LED driver used to provide the first electric current to the set of LEDs prior to the installation of the LED backup controller.

14. The LED backup system of claim 13, wherein the LED backup controller is electrically connectable to the LED driver and the set of LEDs of the existing LED lighting system to provide backup lighting for the set of LEDs.

15. The LED backup system of claim 13, wherein the LED backup controller and the battery are installable into the existing LED lighting system.

16. A light emitting diode (LED) backup system comprising:
    an LED backup controller operable to switch between a standard mode and a backup mode for supplying electrical energy to a set of LEDs, the LED backup controller adapted to transmit electrical energy from a primary power source to the set of LEDs in the standard mode, the LED backup controller adapted to be in selective electrical communication with the primary power supply via a first electrical path in the standard mode, the LED backup controller adapted to transmit electrical energy from a battery to the set of LEDs in the backup mode, the LED backup controller adapted to be in electrical communication with the primary power source via a second electrical path, the second electrical path being a non-switchable electrical path, the LED backup controller operable to switch from the standard mode to the backup mode in response to a failure of the second electrical path to transmit electrical energy to the LED backup controller, the LED backup controller adapted to relay a first electric current, provided by an LED driver, to the set of LEDs in the standard mode, the LED backup controller further comprising:
    an LED backup driver to provide a second electric current to the set of LEDs in the backup mode, the battery supplying electrical energy to the set of LEDs for at least a predetermined elapsed time after the LED backup controller switches from standard mode to backup mode, the predetermined elapsed time determined before the LED backup controller switches from standard mode to backup mode; a battery charger to provide electrical energy to charge the battery; and
    a status monitor to determine a status of the battery, wherein the status monitor comprises:
       a charge fault monitor to determine whether the charger has charged the battery to a predetermined charge level within a predetermined period of time, wherein the status monitor determines that the battery has a battery fault status when the charge fault monitor determines that the battery is unable to reach the predetermined charge level within the predetermined period of time, the predetermined period of time being a period of time determined prior to the status monitor determining the status of the battery, the predetermined charge level being a charge level determined prior to the status monitor determining the status of the battery;

wherein the LED backup controller installable into an existing LED lighting system having the LED driver and the set of LEDs, the LED driver used to provide the first electric current to the set of LEDs prior to the installation of the LED backup controller.

* * * * *